US006865395B2

(12) United States Patent
Riley

(10) Patent No.: US 6,865,395 B2
(45) Date of Patent: Mar. 8, 2005

(54) AREA BASED POSITION DETERMINATION FOR TERMINALS IN A WIRELESS NETWORK

(75) Inventor: Wyatt Riley, King of Prussia, PA (US)

(73) Assignee: Qualcomm Inc., San Diego, CA (US)

(*) Notice: Subject to any disclaimer, the term of this patent is extended or adjusted under 35 U.S.C. 154(b) by 147 days.

(21) Appl. No.: 10/280,639

(22) Filed: Oct. 24, 2002

(65) Prior Publication Data
US 2004/0203880 A1 Oct. 14, 2004

Related U.S. Application Data

(60) Provisional application No. 60/402,339, filed on Aug. 8, 2002.

(51) Int. Cl.[7] .................. H04Q 7/20; H04M 11/04; G01S 3/02
(52) U.S. Cl. .................. 455/456.1; 455/404.2; 455/456.2; 455/456.3; 455/456.5; 455/456.6; 342/464
(58) Field of Search .................. 455/446, 457, 455/422.1, 432.1, 436, 440, 443, 456.1, 456.2, 456.3, 456.5, 456.6, 404.1, 404.2; 342/357.02, 357.15, 464

(56) References Cited

U.S. PATENT DOCUMENTS

| | | | | |
|---|---|---|---|---|
| 4,112,421 A | * | 9/1978 | Freeny, Jr. .................. | 342/457 |
| 5,608,410 A | * | 3/1997 | Stilp et al. .................. | 342/387 |
| 5,613,205 A | | 3/1997 | Dufour .................. | 455/33.2 |
| 5,657,487 A | * | 8/1997 | Doner .................. | 455/456.2 |
| 5,873,040 A | * | 2/1999 | Dunn et al. .................. | 455/456.2 |
| 5,969,669 A | * | 10/1999 | Ishikawa et al. .................. | 342/357.02 |
| 6,161,018 A | * | 12/2000 | Reed et al. .................. | 455/456.1 |
| 6,236,365 B1 | * | 5/2001 | LeBlanc et al. .................. | 342/457 |
| 6,246,861 B1 | * | 6/2001 | Messier et al. .................. | 455/12.1 |
| 6,249,252 B1 | * | 6/2001 | Dupray .................. | 342/450 |
| 6,263,208 B1 | * | 7/2001 | Chang et al. .................. | 455/456.3 |
| 2001/0022558 A1 | * | 9/2001 | Karr et al. .................. | 342/450 |

FOREIGN PATENT DOCUMENTS

| | | | | |
|---|---|---|---|---|
| GB | 2364617 A | | 2/2000 | ............ H04Q/7/38 |
| GB | 2 364 617 a | * | 9/2002 | ............ H04Q/7/38 |
| WO | 9642179 A1 | | 6/1995 | ............ H04Q/7/38 |
| WO | WO 02/51192 A1 | * | 6/2002 | ............ H04Q/7/38 |
| WO | 0251192 A1 | | 7/2002 | ............ H04Q/7/38 |

* cited by examiner

Primary Examiner—William Trost
Assistant Examiner—Meless Zewdu
(74) Attorney, Agent, or Firm—Philip R. Wadsworth; Charles D Brown; Donald Kordich

(57) ABSTRACT

Techniques to estimate the position of a wireless terminal. In a method, the identities of a number of transmitters (e.g., BTSs) to be used to estimate the position are initially received. Expected areas for these transmitters are then determined. The expected area associated with each transmitter is indicative of an area where the terminal is likely to be located given that the signal from the transmitter is received by the terminal. Each expected area may comprise a location (e.g., the expected area center) to be used as an estimated position of the terminal and an uncertainty (or error estimate) associated with that estimated position. The expected areas for the transmitters are then combined (e.g., based on a weighted average) to determine a combined expected area, which is then provided as the estimate of the position of the terminal.

37 Claims, 10 Drawing Sheets

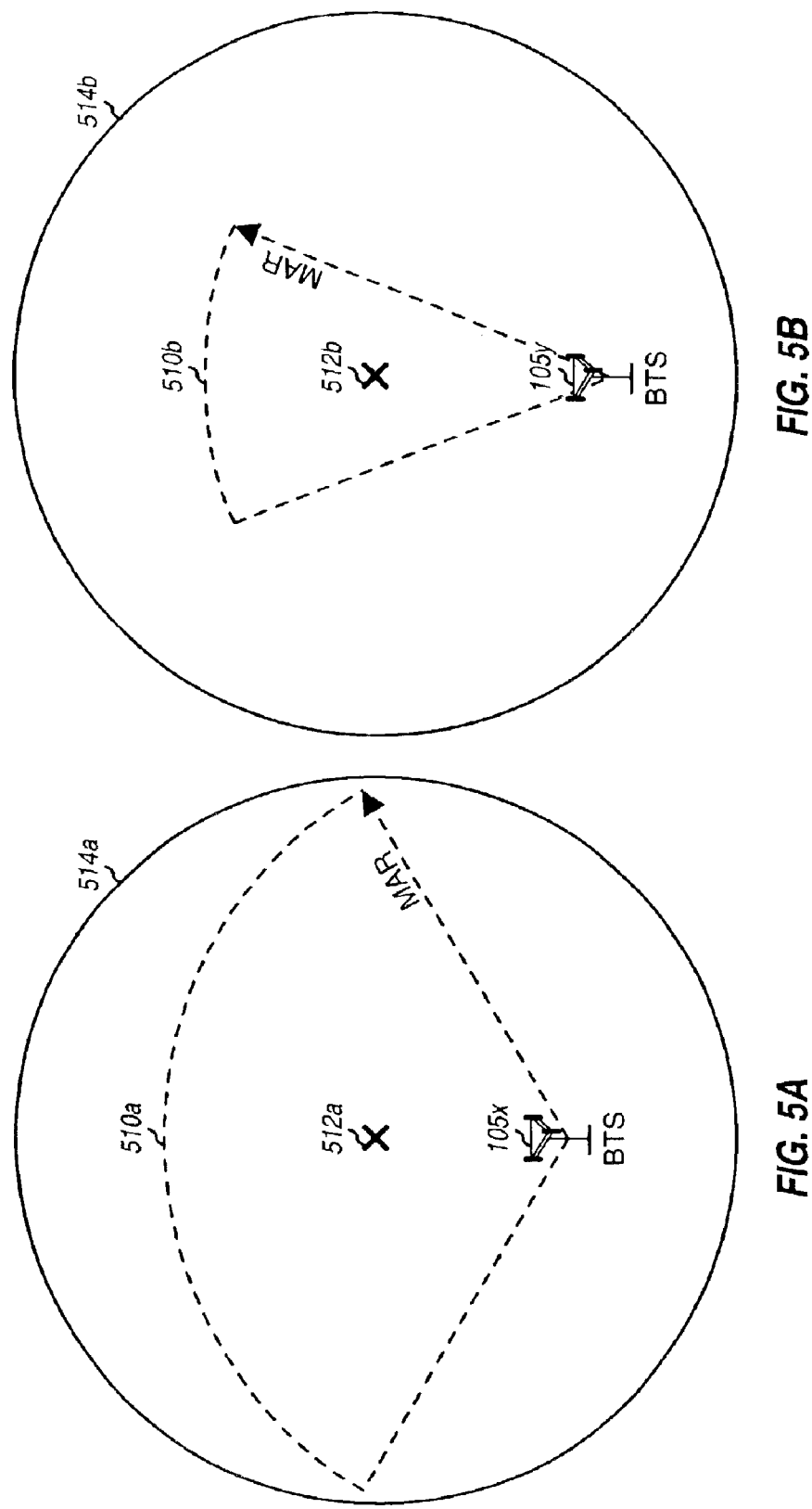

AREA BASED POSITION DETERMINATION FOR TERMINALS IN A WIRELESS NETWORK

RELATED APPLICATIONS

This application claims priority to U.S. Provisional Application Ser. No. 60/402,339, filed on Aug. 8, 2002.

BACKGROUND

1. Field

The presently disclosed subject matter relates generally to position determination and more specifically to a method and apparatus for performing area based position determination for terminals in a wireless network.

2. Background

It is often desirable, and sometimes necessary, to know the position of a wireless user. For example, the Federal Communications Commission (FCC) has adopted a report and order for an enhanced 911 (E-911) wireless service that requires the location of a wireless terminal (e.g., a cellular phone) to be provided to a Public Safety Answering Point (PSAP) each time a 911 call is made from the terminal. In addition to the FCC mandate, a service provider may provide various applications using location services (i.e., services that identify the position of a wireless terminal). Such applications may include, for example, location-sensitive billing, asset tracking, asset monitoring and recovery, fleet and resource management, personal-location services, concierge services, and so on.

The position of a wireless terminal may be estimated using various techniques including "range-domain" and "position-domain" techniques. Range-domain technique use a number of range related measurements to compute the position of a terminal. Range related measurements include measurements that can be used to determine the actual distance between a transmitter and the terminal. Alternatively, a range measurement can be a relative distance from the terminal to a plurality of transmitters. In the case of a relative distance measurement, the distance between the terminal and each transmitter is not known, but there is a common offset added to each distance value. It should be understood that the value could be negative. Some examples of range related measurements include, but are not limited to, pseudo-ranges, actual ranges, time estimates, and attitude estimates. Range related measurements may be obtained from one or more position determination systems. In particular, a GPS position fix may be obtained from range related measurements (i.e., pseudo-ranges) for a number of satellites in the GPS. Alternatively, an AFLT (advanced forward link trilateration) position fix may be calculated from range related measurements for a number of base stations in a cellular (e.g., CDMA) communication system. Still further, a hybrid position fix may be calculated from range related measurements for a number of both satellites and base stations.

The position-domain technique uses knowledge of the position of the base transceiver subsystem (BTS) that is "serving" the terminal (i.e., is in communication with the terminal) to estimate the location of the terminal. That is, the terminal must be within a known limited radius of the serving BTS since the two are in communication. Typically, each BTS services a defined area, commonly referred to as a "cell." Cells can be divided into "sectors". This is typically done by having different antennas coupled to the BTS cover different sectors of the cell. In this way, terminals in each sector can be distinguished from terminals in each other sector based upon the antenna through which communications with the terminals are established.

The terminal's approximate position may then be estimated to be either: (1) the center of the BTS sector, (2) the BTS antenna location, (3) an externally provided location, (4) a default location, or (5) some other location associated in some way with the location of the BTS. A position fix calculated using the position-domain technique is less accurate than a range-domain position fix. Nevertheless, position-domain position fix may be valuable as an initial fix. Such an initial fix may then be used to help calculate a range-domain position fix. The position-domain fix may also be useful as a final fix if the range-domain position fix is either not available or of poor quality.

Regardless of how the position fix is calculated, it is highly desirable to provide an approximate position estimate for the terminal that is as accurate as possible. Since range-domain fixes are not always available or accurate, it would be helpful to be able to more accurately calculate the position of a wireless terminal using a position-domain technique.

SUMMARY

This document describes a method and apparatus that more accurately estimates the approximate position of a terminal in a wireless network. In one embodiment of the method and apparatus, the terminal's approximate position is estimated based upon an "expected area" associated with a "reference base transceiver subsystem (BTS)". The reference BTS may be any BTS with which the terminal is in communication. The expected area associated with a BTS is an area within which a terminal is likely to be located given that it can receive signals from the BTS. The expected area is: (1) a location that may be provided as the estimated position of the terminal, and (2) an area within which the terminal is likely to be located, where the likelihood may be given by a particular percentage. The expected area associated with each BTS may be modeled based on various parameters, such as the location and orientation of the BTS antenna, maximum antenna range (MAR), and so on.

In another embodiment of the disclosed method and apparatus, a more accurate position-domain position fix for a terminal is estimated by combining the expected areas of multiple BTSs. The terminal may receive signals from a number of BTSs in the wireless network. However, it is not necessary to use information associated with all of the BTSs from which signals are being received for determining the position fix for the terminal. A BTS is referred to as a "measured" BTS if the information associated with that BTS is used to approximate the position of the terminal. The expected areas for the measured BTSs may be combined to determine a combined expected area, which may then be provided as the position-domain position fix for the terminal.

In yet another embodiment of the disclosed method and apparatus, the center and size of the expected area associated with each measured BTS may be adjusted based on various factors prior to being combined. These factors include: (1) the received signal strength of the signal from the BTS as received at the terminal (which is typically given as $E_c/I_o$), (2) the received power for the BTS (which is typically given as $E_c$), or (3) some other factor. The adjusted expected areas for all measured BTSs can then be combined to determine the combined expected area.

In yet another embodiment of the disclosed method and apparatus, the position-domain position fix for a terminal, which may be determined by any of the embodiments described above, is combined with some other position estimate for the terminal to determine an even more accurate position estimate for the terminal. The other position estimate may, for example, be derived based on GPS, AFLT, or both GPS and AFLT.

Various aspects and embodiments of the disclosed method and apparatus are described in further detail below. In particular, methods, program codes, digital signal processors, terminals, systems, and other apparatuses and elements that implement various aspects, embodiments, and features of the disclosed method and apparatus are further described in detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIGS. 5A and 5B are diagrams illustrating the modeling of the expected areas for two different BTSs;

DETAILED DESCRIPTION

Figure 1:
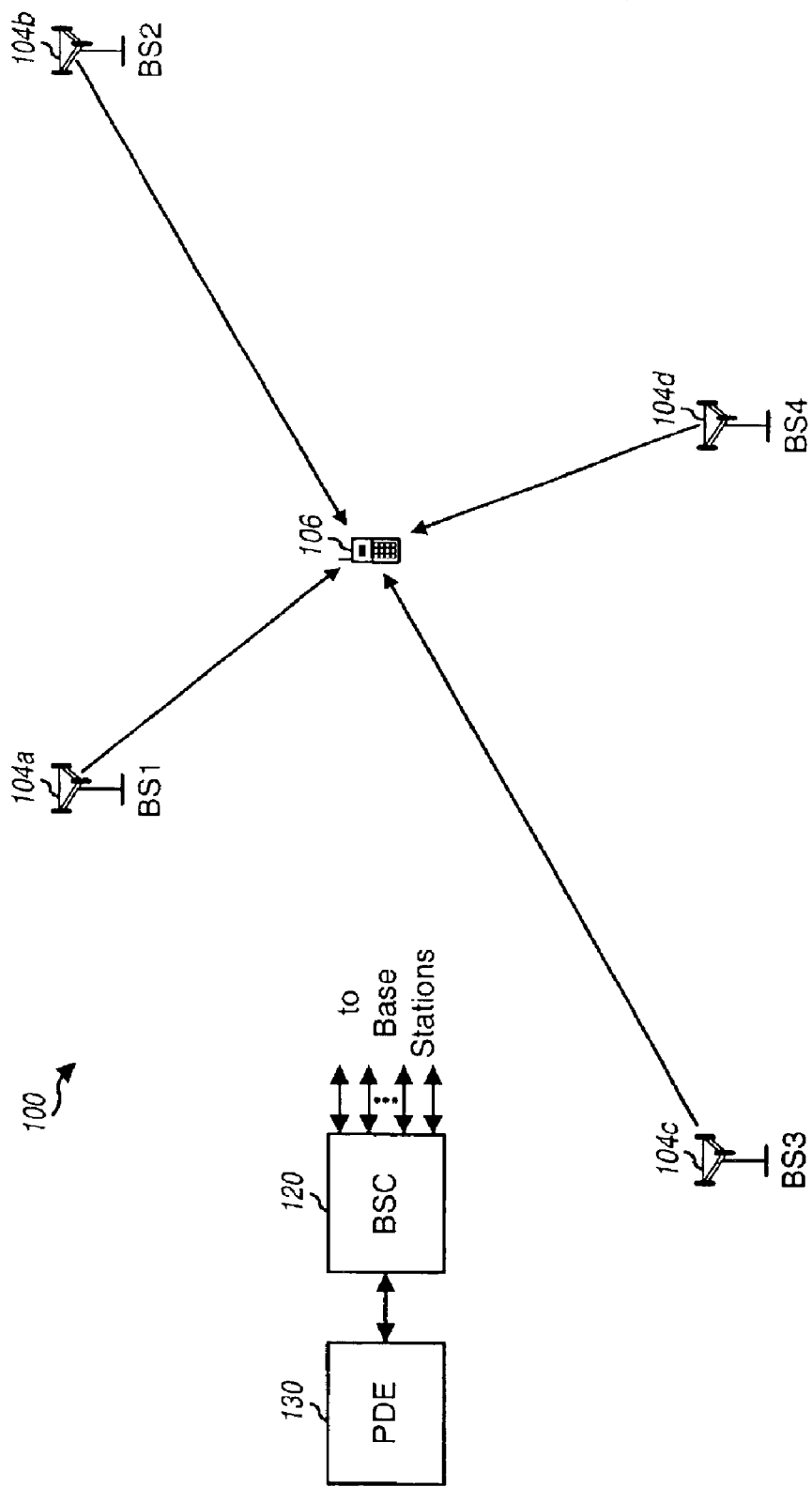
FIG. 1 is a diagram of a wireless communication network.

FIG. 1 is a diagram of a wireless communication network 100, which may be a code division multiple access (CDMA) network, a time division multiple access (TDMA) network, a frequency division multiple access (FDMA) network, or another type of wireless communication network. A CDMA network may be designed in accordance with one or more CDMA standard systems, such as an IS-95 system, a IS-2000 system, or a W-CDMA system. A TDMA network may be designed in accordance with one or more TDMA standard systems, such as a GSM system. The details of these standard systems are well known in the art.

Network 100 includes a number of base transceiver subsystems (BTSs) 104, with each BTS 104 serving a particular geographic area. Only four BTSs 104a through 104d are shown in FIG. 1 for simplicity. The coverage area of a BTS is often referred to as a "cell". The coverage area is that area within which a terminal receives signals from the BTS 104. The size and shape of a cell is typically dependent on various factors such as terrain, obstructions, and so on, and may further vary over time. While it is common for some to refer to a BTS as a "cell", this document makes a distinction between the equipment which is referred to herein as the BTS and the coverage area which is referred to herein as the cell.

A number of terminals 106 are typically dispersed throughout the network. Only one terminal is shown in FIG. 1 for the sake of simplicity. The BTS transmits to the terminal 106 on the forward link and the terminal transmits to the BTS on the reverse link. Each terminal 106 may actively communicate with one or more BTSs. Active communication between the terminal and more than one BTS at a time is referred to as "soft handoff". Active communication refers to the fact that the terminal is registered with the network and can be identified by the BTS. Even if the terminal not in active communication with a BTS, it may receive pilots, pages, and/or other signaling messages from the BTSs. In the example shown in FIG. 1, terminal 106 receives pilots from all four BTSs 104a through 104d. It should be understood that simply receiving a pilot signal from a BTS is not indicative of active communication between the terminal and the BTS.

BTSs 104 typically communicate with a base station controller (BSC) 120, which coordinates the communication between the BTSs and terminals that are in active communication with the BTSs. For position determination, the base station controller 120 may communicate with a position determining entity (PDE) 130. The PDE 130 receives information from and/or provides information to the base station controller 120, as described in further detail below.

Figure 2:
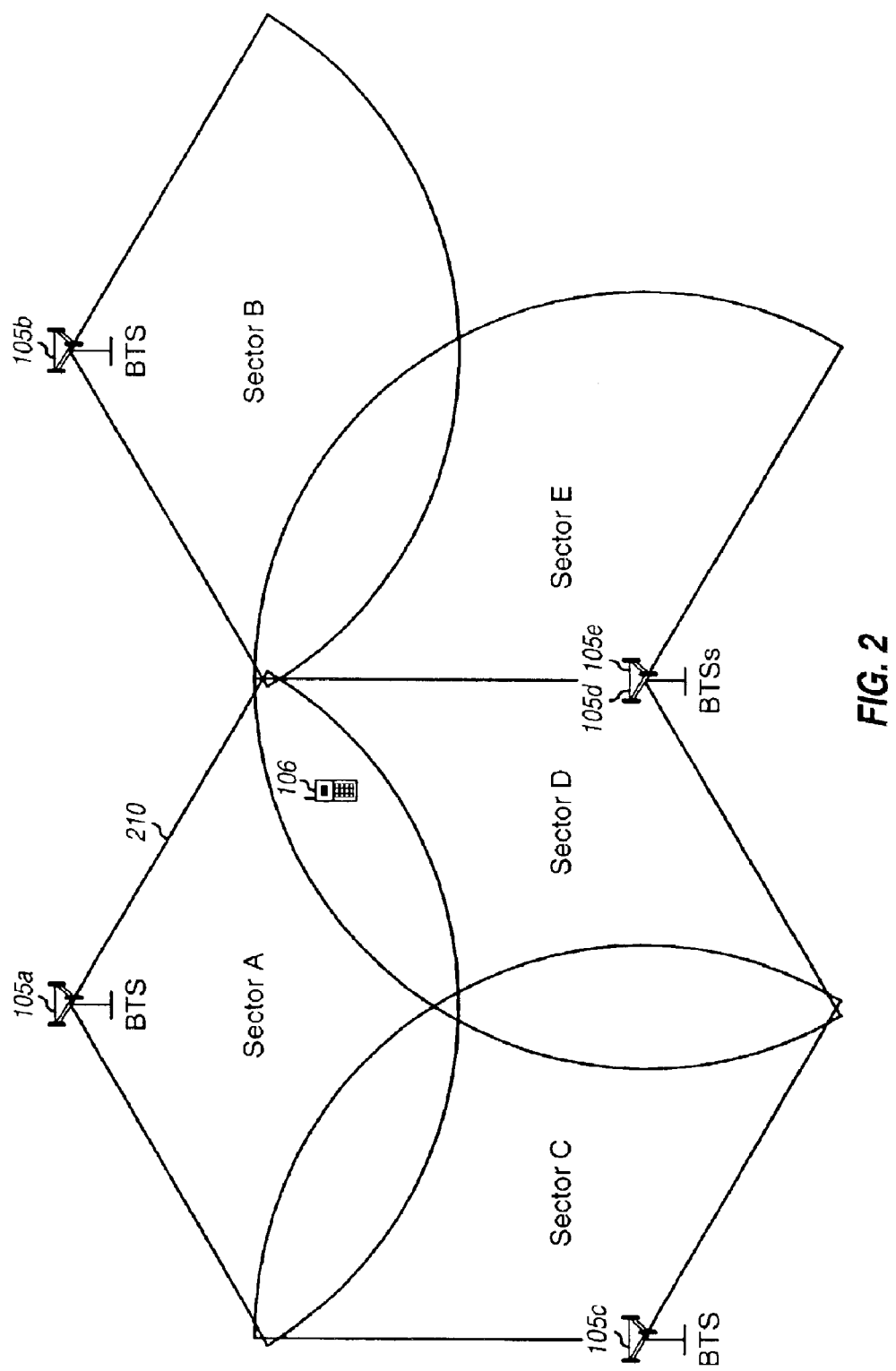
FIG. 2 is a diagram illustrating sectorized coverage areas for the four BTSs shown in FIG. 1.

In a typical network deployment each cell may be partitioned into a number of sectors (e.g., three sectors) to increase the system capacity (i.e., the number of users that the system can support at one time). Each sector is then served by a corresponding BTS. For a sectorized cell, the BTS serving that cell includes a number of BTSs (e.g., three). Each BTS is associated with a respective one of the sectors in that cell. FIG. 2 is a diagram illustrating a system having four "sectorized" cells with a corresponding four BTSs.

In the example shown in FIG. 2, the cell covered by each BTS is represented by an ideal circle. Each sector of the cell is represented by an ideal 120° pie shaped section 210 of the circle. In an actual network deployment, the cell covered by each BTS typically has a shape that is different from the ideal circle, depending on various factors noted above. Moreover, the sectors of a sectorized cell typically overlap at the edges. For simplicity, only five sectors A through E for the four cells served by the BTSs 105a through 105d are shown in FIG. 2.

As noted above, it is often desirable, and sometimes necessary, to know the position of a wireless terminal. A terminal's position may be estimated using range-domain and position-domain techniques. For the range-domain technique, a number of range related measurements (e.g., ranges, pseudo-ranges, etc.) are used to compute a position fix for the terminal. Each range related measurement is made with respect to a transmitter (e.g., a satellite or BTS). A range-domain position fix typically has higher accuracy. However, in some circumstances, there may not be a sufficient number of range related measurements available to compute the range-domain position fix.

Various embodiments of the disclosed method and apparatus are described herein to provide a more accurate position-domain position fix for a terminal. In one embodiment, the terminal's approximate position is estimated based upon an "expected area" associated with a "reference BTS". The reference BTS may be any BTS with which the terminal is in communication. As used herein, an expected area associated with a transmitter, such as a BTS, is an area within which a terminal is likely to be located given that the terminal is capable of receiving signals from the transmitter. The modeling of the expected area associated with each BTS is described below.

In another embodiment, a more accurate position-domain position fix for a terminal is determined by combining expected areas associated with several BTSs. In yet another embodiment, the center and size of the expected area associated with each measured BTS may be adjusted based on various factors prior to being combined. A BTS is referred to as a "measured" BTS if the information associated with that BTS is used to approximate the position of the terminal. The factors that may be used to adjust the expected areas of the measured BTSs include: (1) received signal strength, (2) received power, etc. Additional factors and the way such factors are used is described in greater detail below. The adjusted expected areas for the measured BTSs are then combined to determine the combined expected area.

In yet another embodiment, the position-domain position fix for a terminal may be combined with some other position estimate for the terminal to estimate an even more accurate position for the terminal. The other position estimate may be derived based on GPS, AFLT, or a combination of both GPS and AFLT. These various embodiments of the disclosed method and apparatus are described in further detail below.

Figure 3:
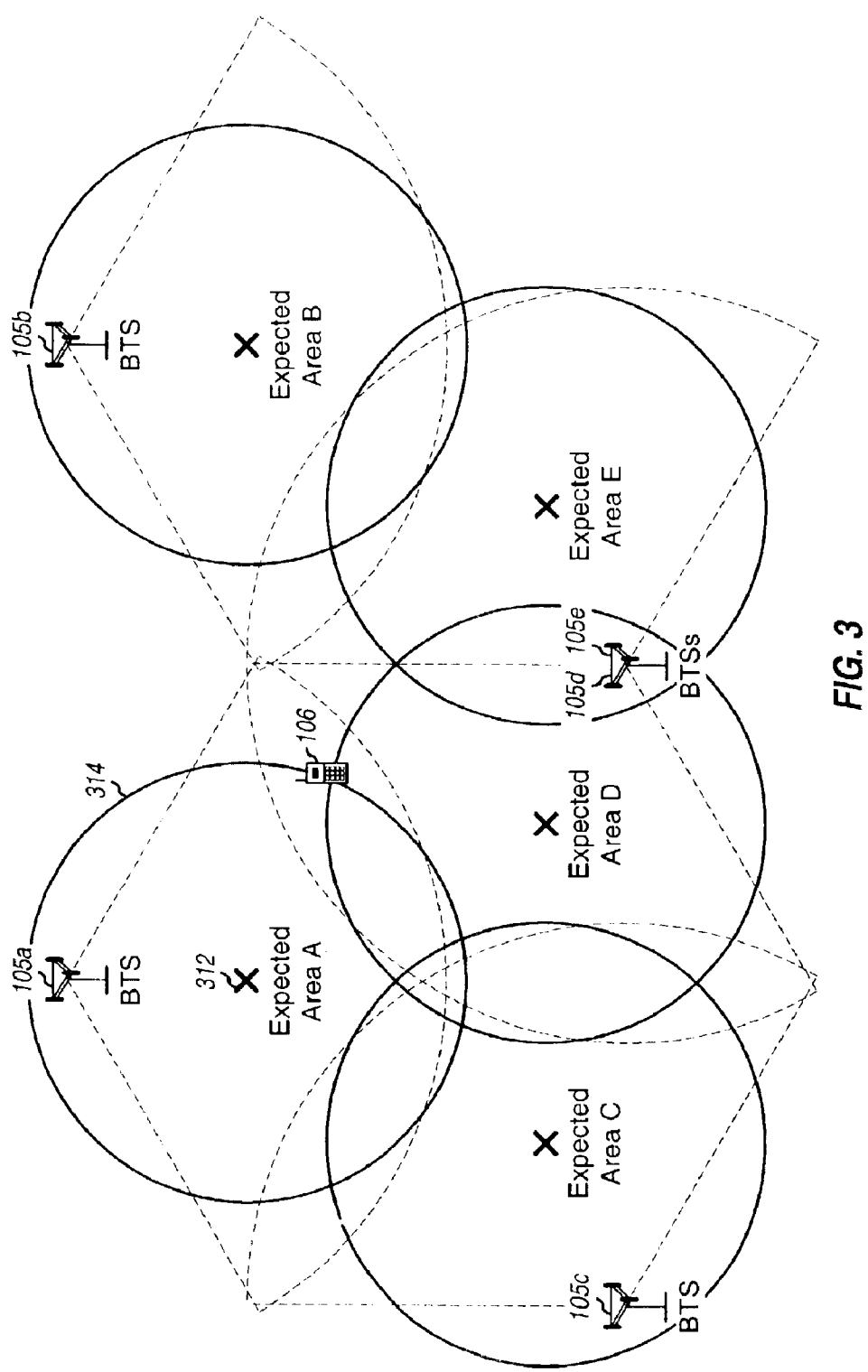
FIG. 3 is a diagram illustrating the modeling of an expected area associated with each BTS in the network.

FIG. 3 is a diagram illustrating an expected area associated with each BTS in the network shown in FIG. 2. The expected area associated with each BTS of FIG. 3 is modeled as a circle 314 that represents a particular probability (e.g., 1-sigma or 67% probability) that a terminal that is receiving signals from the BTS is located within the expected area. Accordingly, if a terminal receives signals from a given BTS, then there is a 67% probability that the terminal is located within the expected area associated with that BTS.

Each expected area is associated with a location that may be provided as the estimated position of a terminal given that it receives the signal from the BTS. This location is typically the center of the expected area. However, some other location within the expected area may also be provided as the position estimate. As shown in FIG. 3, the center of each expected area is marked with an "x" 312. The center, the size, and the shape of the expected area may be provided as part of a position-domain position fix for a terminal. The expected area center would represent the estimated position of the terminal, and the size and shape of the expected area would represent the certainty in using the center of the expected area as the estimated position of the terminal.

The size, shape, and center of the expected area associated with each BTS may be determined based on one or more parameters. Some parameters may relate to the BTS, such as: (1) the location and orientation of the BTS antenna, (2) the maximum antenna range, and so on. Other parameters may relate to the physical attributes of the BTS coverage area, such as: (1) terrain, (2) obstructions, and so on. In addition, some parameters may relate to knowledge of other features of the BTS coverage area, such as statistical distribution of terminal users within the coverage area.

In the example shown in FIG. 3, terminal 106 is located in/near an overlapping region of expected areas A and D. The terminal's position may then be estimated as either (1) the center of expected area A, if BTS 105a is the terminal's reference BTS or (2) the center of expected area D, if BTS 105d is the reference BTS.

As shown by the above example, a position-domain position fix typically has very coarse accuracy. Nevertheless, the position-domain position fix may be valuable as an initial fix that may then be used to calculate a range-domain position fix. Alternatively, the position-domain fix may be used as a final fix if the range-domain position fix is poor or unavailable. In either case, it is highly desirable to provide a position-domain position fix that is as accurate as possible.

Figure 4:
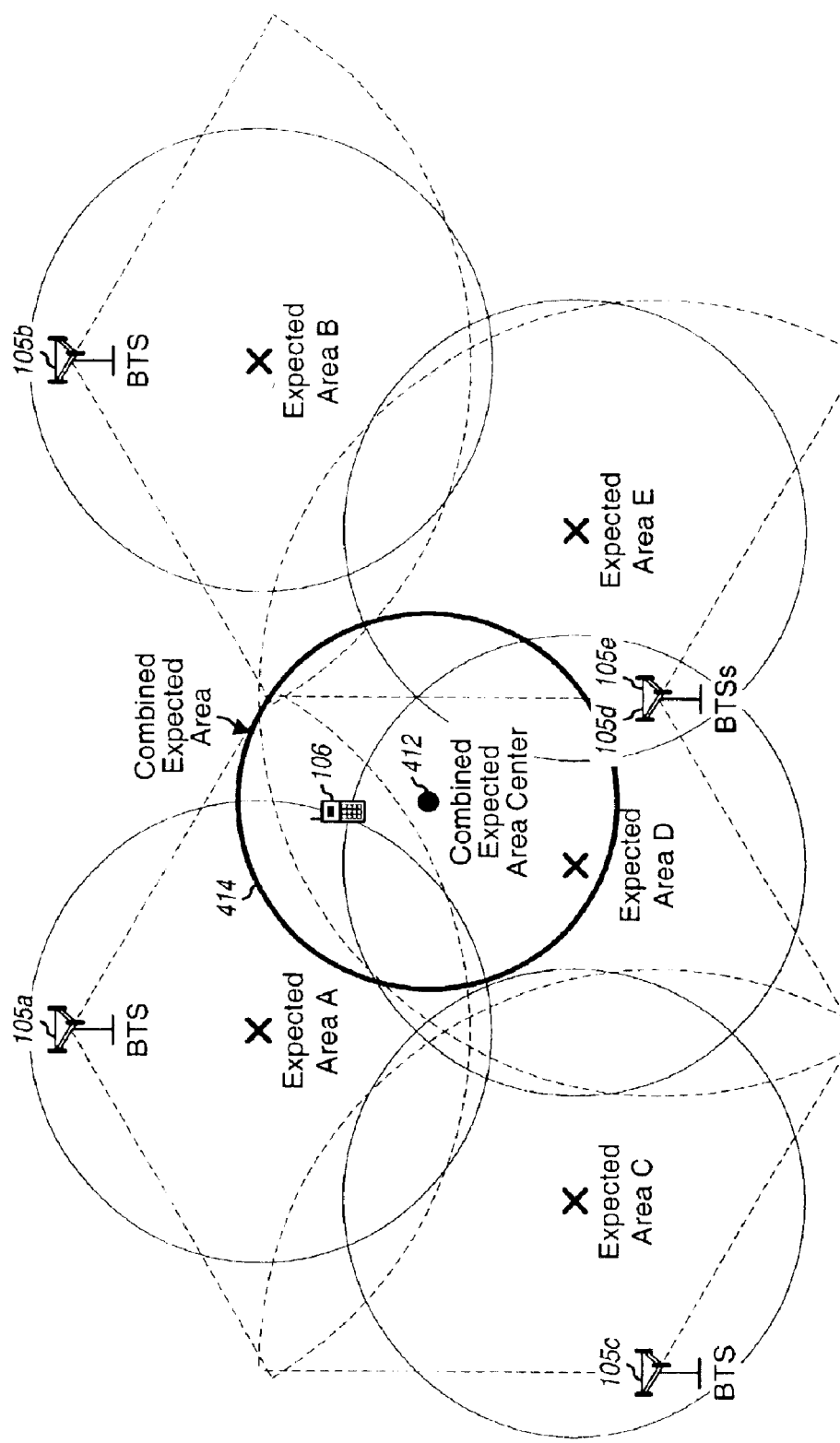
FIG. 4 is a diagram that graphically illustrates the use of multiple expected areas for multiple measured BTSs to calculate a more accurate estimate of the position of a terminal.

FIG. 4 is a diagram that graphically illustrates the use of several expected areas, each associated with a corresponding one of several measured BTSs to estimate a more accurate position of terminal 106. Terminal 106 may receive signals from BTSs 105a through 105e. Of the five received BTSs, only three BTSs 105a, 105d, and 105e are used to approximate the position of the terminal. Accordingly, as noted above, these three BTSs 105a, 105d, and 105e are referred to as the measured BTSs for the terminal. The expected areas for the measured BTSs 105a, 105d, and 105e are then determined (e.g., retrieved from a storage unit) and may be adjusted (e.g., based on the received signal strengths).

The adjusted and/or unadjusted expected areas for the measured BTSs are then combined to provide a combined expected area having a center at location 412 and a size and shape represented in FIG. 4 by a circle 414. The center, size, and shape of the combined expected area might then be provided as the position estimate of the terminal.

As shown by the illustration in FIG. 4, the combined expected area represents a more accurate approximation of the position of terminal 106 than any one of the five individual expected areas A through E shown in FIG. 4. In particular, the center of the combined expected area is a more accurate estimate of the position of the terminal than the center of any of the individual expected areas. Moreover, the uncertainty associated with the use of the combined expected area center as the estimated position of the terminal is likely to be smaller than the uncertainty associated with the use of the center of any of the three individual expected areas A, D, and E, which were used to determine the combined expected area. That is, the fact that the circle 414 is smaller then the circles defining the individual expected areas, indicates that a greater number of terminals deemed to be within the combined expected area will be closer to the center (i.e., within the smaller circle).

FIGS. 5A and 5B are diagrams illustrating the modeling of the expected areas for two different BTSs. In FIG. 5A, BTS 105x is designed to provide coverage for an approximately 120° pie shaped area 510a, with the outer perimeter of the pie shaped area being determined by the maximum antenna range (MAR) of the BTS. The expected area associated with this BTS may be modeled as the pie shaped area 510a, a circle 514a, or some other combination of shape and size. The expected area center 512a may be provided as the estimated position for the terminal.

In FIG. 5B, BTS 105y is designed to provide coverage for a smaller pie shaped area 510b, with the outer perimeter of this pie shaped area also being determined by the maximum antenna range of the BTS. The expected area associated with this BTS may be modeled as the pie shaped area 510b, a circle 514b, or some other combination of shape and size. Again, the expected area center 512b may be provided as the estimated position for the terminal.

For both FIGS. 5A and 5B, the expected area is modeled based on a 2-dimension Gaussian normal distribution. In such a model, the likelihood of the terminal being located at or near the center of the BTS coverage area is greater than away from the coverage area center. A circle or some other shape may then be defined to represent the area within which a terminal is likely to be located, with a particular certainty, given that it can receive signals from the BTS. For a 1-sigma circular expected area, there is a 39 percent certainty of the terminal being located within the expected area if it receives signals from the BTS. The expected area may be defined for any given certainty, with 1-sigma being used typically. The expected area is thus defined based on some statistical parameter, and is not just a circle with a hard cutoff.

The 1-sigma expected area may be determined based on various formulations. In one embodiment, the 1-sigma expected area is defined by a 1-sigma axis, $r_a$, which may be expressed as:

$$r_a \cong \frac{MAR}{3}. \qquad \text{Eq (1)}$$

As shown in equation (1), the 1-sigma axis, $r_a$, (which corresponds to the radius of circles 514a and 514b in FIGS. 5A and 5B) is derived based on the estimated maximum antenna range (MAR) of the BTS. In another embodiment, the 1-sigma expected area is defined by a 1-sigma horizontal estimated position error (HEPE), $r_h$, which may be expressed as:

$$r_h \cong \frac{MAR}{2}. \qquad \text{Eq (2)}$$

As shown in equation (2), the 1-sigma HEPE, $r_h$, is also derived based on the maximum antenna range of the BTS. Other formulations for the 1-sigma expected area may also be used.

In both FIGS. 5A and 5B, the circles 514a and 514b are not drawn to scale if either the 1-sigma axis, $r_a$, or the 1-sigma HEPE, $r_h$, is used as the radius for the 1-sigma expected areas represented by the circles 514a and 514b.

In general, various shapes, sizes, and center locations may be used for the expected area associated with each BTS, depending on the parameters used to model the expected area. In one implementation, a circular model is used for the expected area associated with each BTS. The circular model for the expected area is especially good if the distribution of the terminals within the coverage area of the BTS approximates a circular pattern. The circular statistical model also allows for a convenient mathematical formulation, as will be seen later in this discussion.

In another embodiment of the disclosed method and apparatus, the center and size of the expected area associated with each measured BTS may be adjusted based on one or more factors. If the only information available is that a terminal receives the signal from a BTS, then the expected area associated with that BTS, without any adjustment, may be provided as an approximate position fix for the terminal. However, if other information is available for the terminal, then the expected area associated with the BTS may be adjusted based on the additional information to determine a more accurate expected area associated with this terminal.

Various factors may be used to adjust the expected area associated with a BTS for a given terminal. One such factor is the received signal strength, which is typically expressed as an energy-per-chip to total-noise ratio ($E_c/I_o$). The received signal strength may be determined based on measurement of a pilot or some other transmission from the BTS. Alternatively, the received signal strength may be determined based on the reverse link signal received at the BTSs from the terminal.

The received signal strength at the terminal for a given BTS may be mapped to a scale factor. This scale factor may then be used to adjust the expected area associated with the BTS. In one implementation, a 0 dB $E_c/I_o$ is mapped to a scale factor of 0.9 (i.e., S=0.9) and a −40 dB $E_c/I_o$ is mapped to a scale factor of 1.1 (i.e., S=1.1). Linear interpolation may then be used to determine the scale factor for other values of received signal strength. For this implementation, the scale factor S may be expressed as:

$$S = 0.9 - \frac{E_c/I_o(\text{dB})}{200}. \qquad \text{Eq (3)}$$

The scale factor may also be limited to a specific range of values (e.g., $0.9 \leq S \leq 1.1$). A scale factor of less than one reduces or shrinks the expected area, and a scale factor of greater than one enlarges the expected area.

In another implementation, a 0 dB $E_C/I_0$ is mapped to a scale factor of 0.6 (i.e., S=0.6) and a −40 dB $E_C/I_0$ is mapped to a scale factor of 1.4 (i.e., S=1.4). Again, linear interpolation may be used to determine the scale factor for other values of received signal strength. For this implementation, the scale factor S may be expressed as:

$$S = 0.6 - \frac{E_c/I_o(\text{dB})}{50}. \qquad \text{Eq (4)}$$

This implementation has a steeper slope than the one described prior. It should be understood that other mapping between received signal strength and scale factor may also be used.

Another factor that may also be used to adjust the expected area associated with a BTS for a given terminal is the received power of the signal from the BTS, as measured at the terminal. This received power may be expressed as an energy-per-chip ($E_c$) and only takes into consideration the signal of interest while ignoring the noise and interference ($I_o$) The received power may also be calculated from the pilot transmitted by the BTS or some other signal component. The received power may then be mapped to a scale factor, which may be expressed as:

$$S=f(E_c), \qquad \text{Eq (5)}$$

where $f(E_c)$ is some defined function of $E_c$.

Another factor that may be considered in the adjustment of the expected area is transmit power level. Each BTS typically transmits its signal at a particular power level determined by the network operator. The network operator may set the transmit power levels for all BTSs to be the same. Alternatively, different levels may be used for different BTSs. Thus, knowledge of the BTS transmit power levels may also be used to adjust the expected areas. The received power ($E_c$) and transmit power level (P) may then be mapped to a scale factor, which may be expressed as:

$$S=f(E_c,P), \qquad \text{Eq (6)}$$

where $f(E_c,P)$ is some defined function of both $E_c$ and P. As a specific example, the received powers from the BTSs may be normalized to account for different transmit power levels used by different BTSs. The normalized received powers may then be used to adjust the expected areas of the BTSs.

Yet another factor that may be used to adjust the expected area associated with a BTS is round trip delay (RTD). A terminal can identify the earliest arriving multipath component (of sufficient strength) of a forward link signal from the BTS. The time at which this multipath component reaches the terminal's antenna may be determined. This time is then used as the terminal's reference time. The terminal may then transmit a reverse link signal back to the BTS such that the reverse link signal is received by the BTS at a time delay of $2\tau$ from the time the forward link signal was transmitted. This delay of $2\tau$ is referred to as the RTD. The RTD may be measured at the BTS and used to adjust the expected area associated with the BTS. Other factors may also be used to adjust the expected area associated with a BTS.

As described above, the size of the expected area associated with a BTS can be adjusted based on a scale factor assigned to that BTS. The scale factor may also be used to move the center of the expected area either toward or away from a nominal center. By adjusting the size and center of the expected area, the contribution of the associated BTS can be adjusted accordingly in the derivation of the position estimate for the terminal.

Figure 6B:
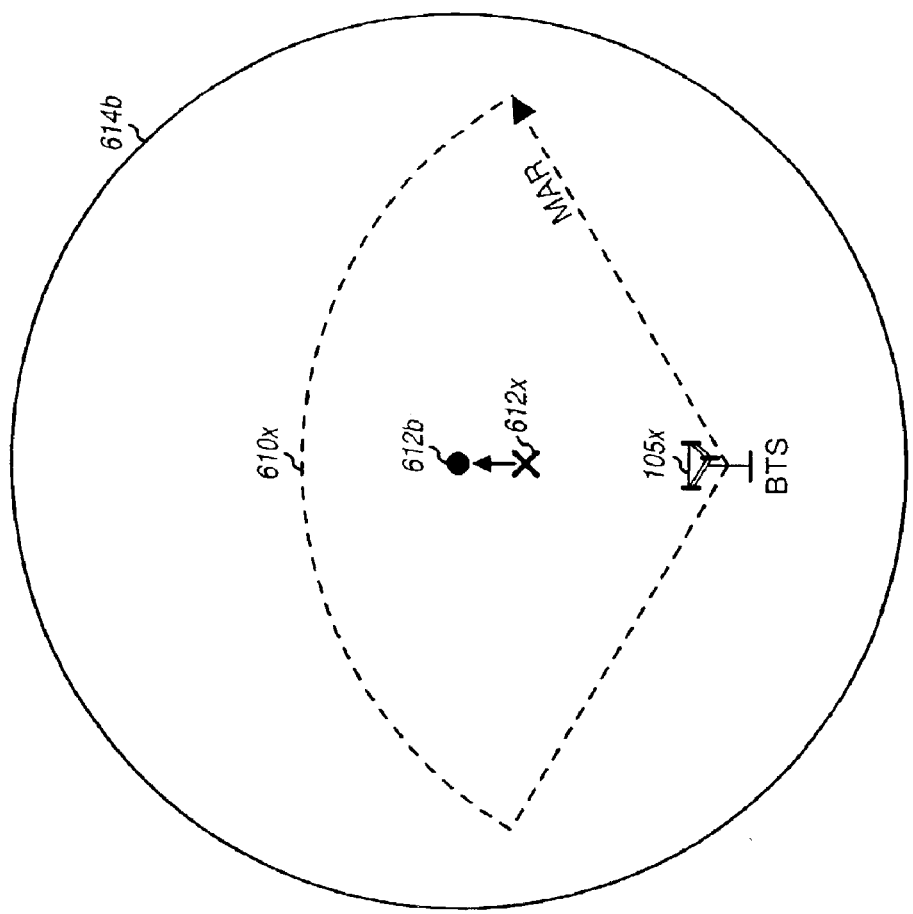
FIGS. 6A and 6B are diagrams illustrating the adjustment of the expected area associated with a BTS based on received signal strength.
Figure 6A:
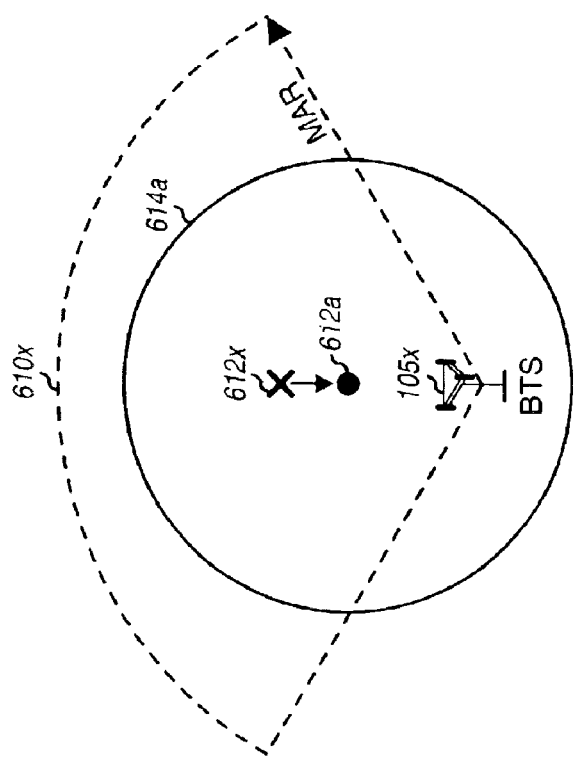

FIGS. 6A and 6B are diagrams illustrating the adjustment of the expected area associated with a BTS based on received signal strength. Due to path loss in the propagation environment, the power level of a received signal at a terminal is inversely related to the square of the distance from the transmitting BTS. This general formula assumes that the transmitted signal is not degraded by other transmission phenomena such as multipath. The received signal strength may thus be used to as an estimate the distance between the BTS (or the BTS antenna) and the terminal. The center and the size of the expected area associated with the BTS for this terminal may then be adjusted based on the received signal strength.

In FIG. 6A, the received signal strength is strong, which indicates that the terminal is likely to be located closer to the transmitting BTS. The center of the expected area may then be moved from a nominal center 612x to a new center 612a that is closer to the BTS. The new center 612a is located on a straight line between the nominal center 612x and the BTS antenna. Moreover, the new center 612a is moved to a specific point on this line determined by the scale factor. The new center 612a is located at the nominal center 612x if the scale factor is equal to 1.0 and is moved toward the BTS if the scale factor is less than 1.0.

As also shown in FIG. 6A, the size of the expected area is also reduced from the nominal size to a smaller size represented by a circle 614a. This smaller size more closely matches the smaller area where such a strong signal strength may be received.

In FIG. 6B, the received signal strength is weak, which indicates that the terminal is likely to be located farther away from the transmitting BTS. The center of the expected area may then be moved from the nominal center 612x to a new center 612b that is farther away (in a radial direction) from the BTS. Moreover, the size of the expected area may be enlarged from the nominal size to a larger size represented by a circle 614b. This larger size represents the larger area where such a weak signal strength may be received.

The adjustment of the expected areas may also be selectively performed for some BTSs and not for some other BTSs. For example, the received signal strength for each BTS may be observed over a particular time interval. The expected area associated with each BTS may then be adjusted if the fluctuation in the received signal strength is below a particular threshold and not adjusted if the fluctuation is greater than the particular threshold.

Additionally, the scale factors used for modifying the size of the expecting area and for moving the center of the expected area may be chosen separately. For example, the scale factor for size of expected area may be chosen based on $E_c$, and the scale factor for center of expected area may be chosen based on $E_c/I_o$.

In yet another embodiment of the disclosed method and apparatus, a more accurate position fix for a terminal is determined by combining the expected areas for multiple measured BTSs. The expected area associated with each measured BTS may be adjusted or unadjusted, as described above. The multiple expected areas for the measured BTSs may be combined in various manners to determine a combined expected area that may then be provided as the approximate position fix for the terminal.

In one implementation, the combined expected area is determined based upon a weighted average of the expected areas for the measured BTS. In a simple case, two expected areas M and N for two measured BTSs may be combined to determine the combined expected area. The expected area M for the first measured BTS may be defined to have a center with Cartesian coordinate of $(x_m, y_m)$ and a size/shape that is represented by a first circle. Similarly, the expected area N for the second measured BTS may be defined to have a center with Cartesian coordinate of $(x_n, y_n)$ and a size/shape that is represented by a second circle. The center of the combined expected area may then be defined to have a Cartesian coordinate of $(x_p, y_p)$, which may be calculated as:

$$x_p = W_m x_m + W_n x_n,$$

and $$y_p = W_m y_m + W_n y_n, \quad \text{Eq (7)}$$

where $W_m$ and $W_n$ are the weights to be used for expected areas M and N, respectively, and $W_m + W_n = 1$. The weights may be derived as described below. As shown in equation (7), each dimension of the Cartesian coordinate $(x_p, y_p)$ for the combined expected area center is a weighted average of that dimension for the two expected area centers being combined.

If more than two expected areas are to be combined, then equation (7) may be generalized as follows:

$$x_p = \sum_{i=1}^{N_{BTS}} W_i x_i, \text{ and} \quad \text{Eq (8)}$$

$$y_p = \sum_{i=1}^{N_{BTS}} W_i y_i,$$

where $N_{BTS}$ is the number of expected areas being combined and $$\sum_{i=1}^{N_{BTS}} W_i = 1.$$

The weight $W_i$ used for each expected area may be determined based on various parameters. In one implementation, the weight for each expected area is determined based on the size of the expected area. For this implementation, the weight $W_i$ for the i-th expected area may be expressed as:

$$W_i \propto \frac{1}{HEPE_i^2},\qquad \text{Eq (9)}$$

where $HEPE_i$ is the horizontal estimated position error, which may be expressed as:

$$HEPE_i = \sqrt{\sigma^2_{East} + \sigma^2_{North}},\qquad \text{Eq (10)}$$

and $\sigma_{East}$ and $\sigma_{North}$ are the variances for the east and north directions associated with the i-th expected area. In particular, $\sigma_{East}$ is the distance from the center of the expected area to the east (or right) edge of the one-sigma circle, and $\sigma_{North}$ is the distance from the expected area center to the north (or upper) edge of the one-sigma circle. As shown in equation (9), the weight $W_i$ for the i-th expected area is inversely related to the square of the $HEPE_i$ for that expected area. The weighting in equation (9) is similar to a normal weighted-least-squares averaging, e.g. in a one-dimensional case where the weights are proportional to $1/\sigma^2$. Using equation (9), smaller expected areas (i.e., those with smaller uncertainties) are assigned higher weights than larger expected areas.

It should be noted that the weights may also be derived based on some other parameters, or any combination of parameters.

The combined expected area has a size that is indicative of the uncertainty in the use of this combined expected area as the position estimate for the terminal. The size (or uncertainty) of the combined expected area is determined based on the sizes (or uncertainties) of all expected areas being combined, the weights used to combine these expected areas, some other factors, or a combination thereof.

One factor that may be used to determine the size of the combined expected area relates to the number of measured BTSs being combined. If the measurements from the BTSs are assumed to be independent, then the size of the combined expected area may be reduced by (e.g., the square root of) the number of BTSs being combined. A limit may be imposed on the amount of reduction in the size of the combined expected area based on the number of measured BTSs. As a specific example, the size of the combined expected area may be prevented from shrinking any smaller even if more than 10 measured BTSs are used.

Another factor for determining the size of the combined expected area relates to the smallest size of all expected areas being combined. If the measurements from the BTSs are useful in deriving a more accurate combined expected area, then there is a reasonable "fit" between the individual expected areas being combined. In that case, the size of the combined expected area should be no larger than the smallest size of all individual expected areas being combined. Each expected area may contribute to further reduce the size of the combined expected area.

Yet another factor for determining the size of the combined expected area relates to a "unit fault", which is indicative of how well individual expected areas overlap the combined expected area. If there is a "poor" fit between the measurements (as illustrated below in FIG. 7B), then the size of the combined expected area may actually be larger (or worse) than that of the smallest individual expected area. In that case, the unit fault would be greater than 1.0, and the combined expected area size may be scaled larger by the unit fault (which would then correspondingly increase the HEPE of the combined expected area).

The unit fault may be calculated based on a normalized average "separation-sigma" between the combined expected area and each individual expected area used to determine the combined expected area. In one implementation, the separation-sigma $\sigma_i$ for the i-th expected area is defined as:

$$\sigma_i = \frac{D_i}{RSS},\qquad \text{Eq (11)}$$

where $D_i$ is the distance between the center of the combined expected area and the center of the i-th expected area, and RSS is the root-sum-square of the i-th expected area HEPE and the combined expected area HEPE.

The unit fault F may then be defined as:

$$F = \frac{\sum_{1}^{N_{BTS}} \sigma_i}{N_{BTS} - 1}.\qquad \text{Eq (12)}$$

As shown in equation (12), the unit fault F is representative of the cost in least mean square (LMS).

If the unit fault computed for the combined expected area is greater than unity (i.e., F>1.0), then the size of the combined expected area may be scaled larger by the unit fault. Otherwise, if the unit fault is less than unity (i.e., F<1.0), then the size of the combined expected area may be scaled smaller by the unit fault. If the unit fault is less than unity (i.e., F<1.0), this may be caused by correlation of the expected areas and not by overestimated expected area sizes. As a result, it is often better to ignore values of F that are less than 1, instead of scaling down the combined expected area size as described above.

Figure 7A:
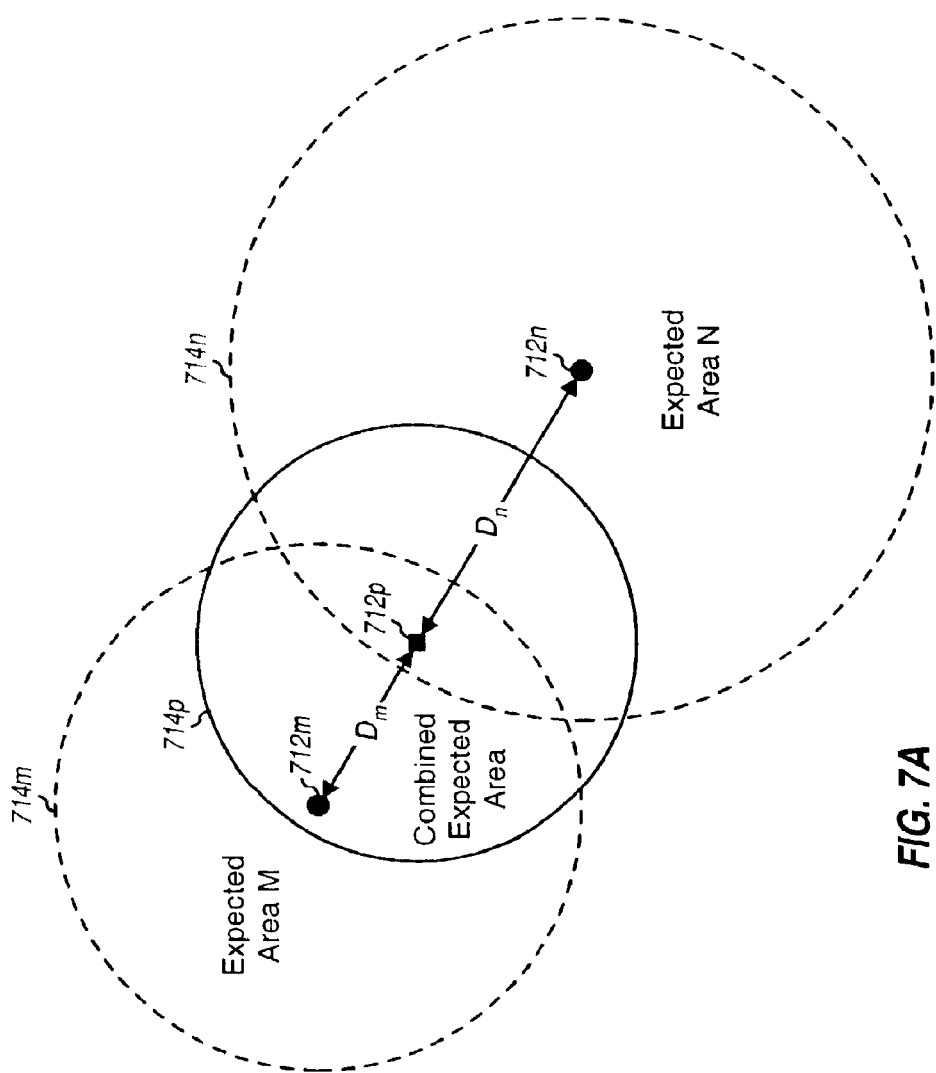
FIG. 7A is a diagram illustrating the combination of two overlapping expected areas M and N based on a weighted average to derive a combined expected area.

FIG. 7A is a diagram illustrating the combining of two overlapping expected areas M and N for two measured BTSs based on a weighted average to determine a combined expected area 714$p$. Each of the two expected areas may be either an unadjusted expected area (i.e., with a scale factor of 1.0) or an adjusted expected area determined based on a scale factor $S_i$ assigned to the BTS for the expected area. The expected area M for the first measured BTS has a center at location 712$m$ and a size/shape represented by a circle 714$m$. Similarly, the expected area N for the second measured BTS has a center at location 712$n$ and a size/shape represented by a circle 714$n$. The centers of the expected areas M and N are defined by Cartesian coordinates of $(x_m, y_m)$ and $(x_n, y_n)$, respectively.

The combined expected area has a center at location 712$p$ and a size/shape represented by a circle 714$p$. The center of the combined expected area has a Cartesian coordinate of $(x_p, y_p)$, which may be determined as shown in equation (7). Graphically, a straight line may be drawn between the two expected area centers 712$m$ and 712$n$. With weighted averaging, the center of the combined expected area is located along this line, with the exact location being determined by the weights $W_m$ and $W_n$, assigned to the expected areas M and N, respectively. More specifically, if the distance between the two expected area centers 712$m$ and 712$n$ is D, then the distances $D_m$ and $D_n$ between these expected area centers 712$m$ and 712$n$ and the combined expected area center 712$p$ may be expressed as:

$$D_m = W_n D,$$

and $$D_n = W_m D,\qquad \text{Eq (13)}$$

where $D_m + D_n = D$.

For the example shown in FIG. 7A, there is a reasonable fit between the two expected areas being combined. Thus, the size (and uncertainty) of the combined expected area is reduced by (1) the number of measured BTSs being combined, which is two for this example, and (2) the smaller size of the two expected areas being combined, which is the size of the expected area M.

Figure 7B:
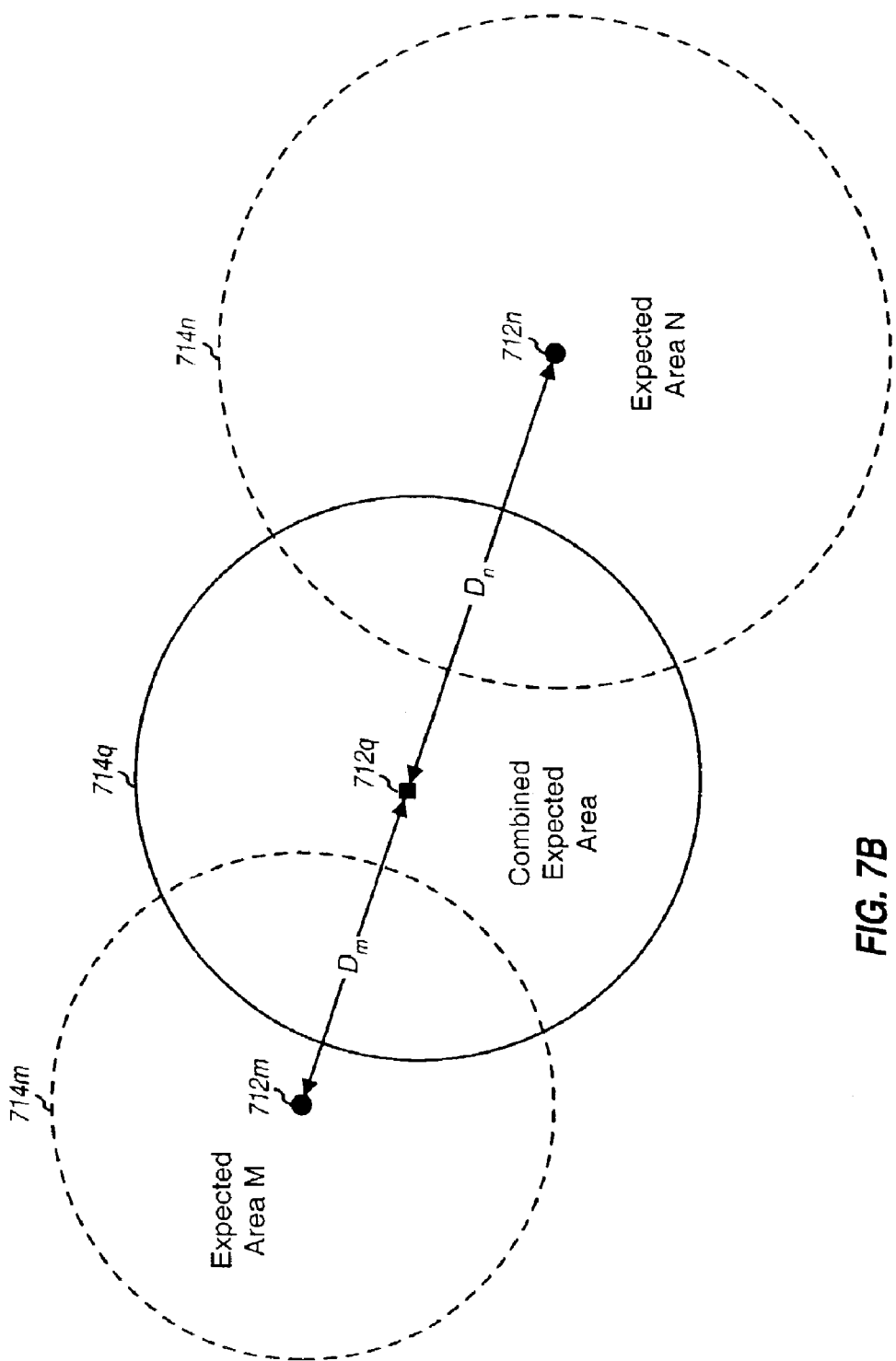
FIG. 7B is a diagram illustrating the combination of two non-overlapping expected areas M and N based on a weighted average to derive a combined expected area.

FIG. 7B is a diagram illustrating the combining of two non-overlapping expected areas M and N based on a weighted average to derive a combined expected area 714q. The two expected areas have centers at locations 712m and 712n, which are respectively defined by Cartesian coordinates of $(x_m, y_m)$ and $(x_n, y_n)$. The sizes and shapes of these two expected areas are represented by circles 714m and 714n.

The combined expected area has a center at location 712q with a Cartesian coordinate of $(x_p, y_p)$, which may be determined as shown in equation (7). The size/shape of the combined expected area is represented by a circle 714q. For the example shown in FIG. 7B, the two expected areas M and N being combined are non-overlapping, and the unit fault is determined to be greater than one (i.e., F>1.0). In this case, the size of the combined expected area is scaled larger by the unit fault. The combined expected area would then have a size that is larger than the smaller of the two expected areas being combined, as is graphically illustrated in FIG. 7B.

Figure 8:
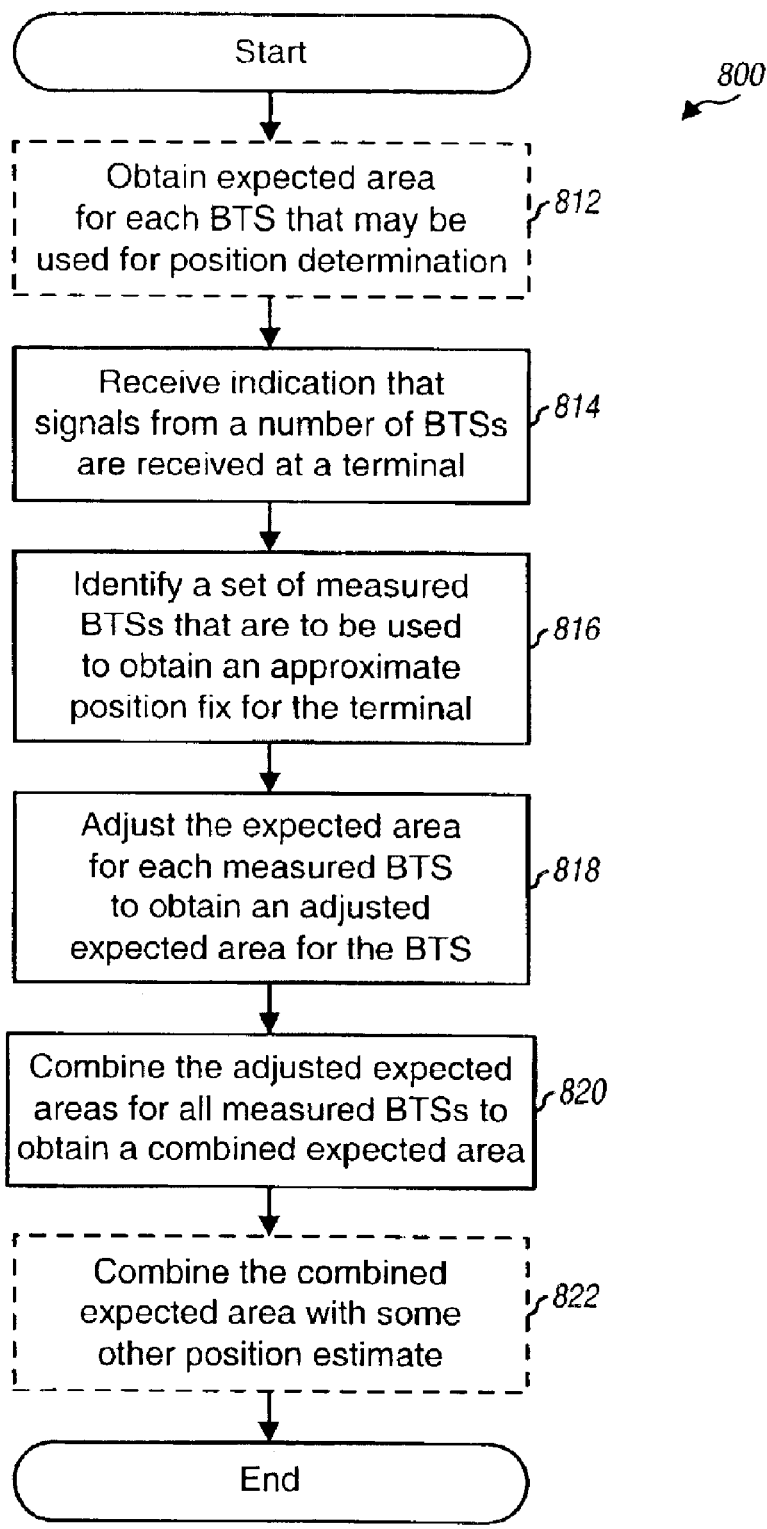
FIG. 8 is a flow diagram of a process for deriving a more accurate approximate position fix using area based position determination.

FIG. 8 is a flow diagram of a process 800 for estimating a more accurate approximate position for a terminal using area based position determination. Initially, an expected area is determined for each BTS that may be used for position-domain position determination (step 812). The expected area may be determined based on the BTS maximum antenna range and/or some other parameters, as described above. The expected areas for the BTSs may then be stored in a storage unit such as a base station Almanac. The expected areas are typically determined once, e.g., at network deployment. Thereafter, the expected areas may be obtained from the storage unit as needed, as indicated by a dashed box for step 812.

For each position-domain position fix, an indication is initially received that signals from a number of BTSs are received at the terminal (step 814). A set of measured BTSs is then identified from among all of the received BTSs (step 816). The measured BTSs are the ones that will be used to estimate the approximate position for the terminal. The expected area associated with each measured BTS is then determined (e.g., retrieved from memory) and may be adjusted to determine an adjusted expected area associated with the BTS (step 818). The adjustment of the expected area associated with each measured BTS may be performed based on a scale factor assigned to that BTS. This scale factor may in turn be determined based on the received signal strength and/or some other factor, as described above. The adjustment may also be omitted for any BTS by setting the scale factor for the BTS to unity ($S_i=1.0$).

The adjusted and/or unadjusted expected areas for all measured BTSs are then combined to determine a combined expected area, which may be provided as the approximate position fix for the terminal (step 820). The center of the expected area represents the estimated position of the terminal, and the size of the expected area represents the certainty in the estimated position. For example, if a 1-sigma circular combined expected area is provided, then there is a 39 percent probability that the terminal is located within the combined expected area. The combining of the expected areas may be performed as described above.

The position-domain fix based on the combined expected area may also be combined with some other position estimate available for the terminal (step 822). This other position may be estimated based on some other measurement type such as GPS, AFLT, or (3) hybrid GPS and AFLT. A GPS position is estimated based on GPS satellites and typically has the highest possible accuracy, but it may not be available for certain environments (e.g., some indoor locations). An AFLT position is estimated based on measurements from a wireless communication system and has reduced accuracy. However, the AFLT position estimate is commonly available in urban area and other areas where GPS may not be available. A hybrid position may be estimated based on measurements from both the GPS and wireless communication system. Step 822 is optional and indicated as such by the dashed box.

Steps 816 through 822 may be performed at the terminal, a BTS, a PDE, or some other network entity.

It should be understood that variations and modifications of the embodiments described above may be made based on the teachings described herein. Moreover, alternative embodiments of the method and apparatus described herein may also be derived. The following describes some such alternative embodiments.

In one alternative embodiment, the expected area associated with a BTS is adjusted based on (1) the received power, $P_{rx}$, which is the power received at a terminal for the BTS and (2) the predicted power, $P_{pre}$, which is the power predicted to be received by the terminal for this BTS.

The predicted power, $P_{pre}$, may be calculated based on a path loss prediction model and a set of parameters. Various path loss prediction models may be used to compute the predicted power, one example of which is the Okumura-Hata model. The predicted power, $P_{pre}$, at the terminal for a given BTS may be expressed as a function of these parameters, as follows:

$$P_{pre} = g(G, P, D, T, L, \text{and } m), \text{ and} \qquad \text{Eq (14)}$$

where

P is the power at the antenna port of the BTS (before antenna amplifier),

G is the antenna gain for the BTS,

D represents the propagation model (e.g., Okumura-Hata),

T represents the terrain database, which contains the terrain undulation information for path loss prediction, L represents the land cover/land use database, which contains information such dense urban, rural, water, and so on, for the propagation path, m is a potential position for the terminal (the predicted power is computed assuming that the terminal is located at position m), and g is a function of all the parameters as arguments.

The parameters P and G may be combined to provide the input power into the path loss prediction model.

As shown in equation (14), the predicted power, $P_{pre}$, is a function of the potential position m of the terminal. If the center of the expected area is used as the potential position m, then the expected area center may be adjusted such that the difference between the predicted power and the received power is minimized. This criterion may be expressed as:

$$\min_{\{m, m \in M\}} \{P_{pre}(m) - P_{rx}\}, \qquad \text{Eq (15)}$$

where {m, m∈M} represents the set of all possible positions allowed for the center of the expected area.

The adjusted expected area associated with this BTS may then be provided as the position-domain estimate for the terminal. Alternatively, this adjusted expected area may be combined with the adjusted and/or unadjusted expected areas for other measured BTSs to determine a combined expected area, which is then provided as the position-domain estimate for the terminal.

In another alternative embodiment, the expected areas for multiple measured BTSs may be adjusted and combined based on the received power and the predicted power for each of these BTS. If the center of the combined expected area is used as the potential position m for the terminal, then the center of the combined expected area may be adjusted such that the root mean square difference between the predicted powers and the received powers for the measured BTSs is minimized. This criterion may be expressed as:

$$\min_{\{m,m\in M\}} \left\{ \sum_{\{k,k\in K\}} |P_{pre}(m) - P_{rx}|^2 \right\}^{1/2}, \qquad \text{Eq (16)}$$

where {m, m∈M} represents the set of all possible positions allowed for the center of the combined expected area and {k, k∈K} represents the set of all measured BTSs. The specific position m to use as the combined expected area center, and thus the estimated position for the terminal, is the one that has the minimum value in equation (16). This embodiment is an alternative way to adjust and combine the expected areas for the measured BTSs.

Figure 9:
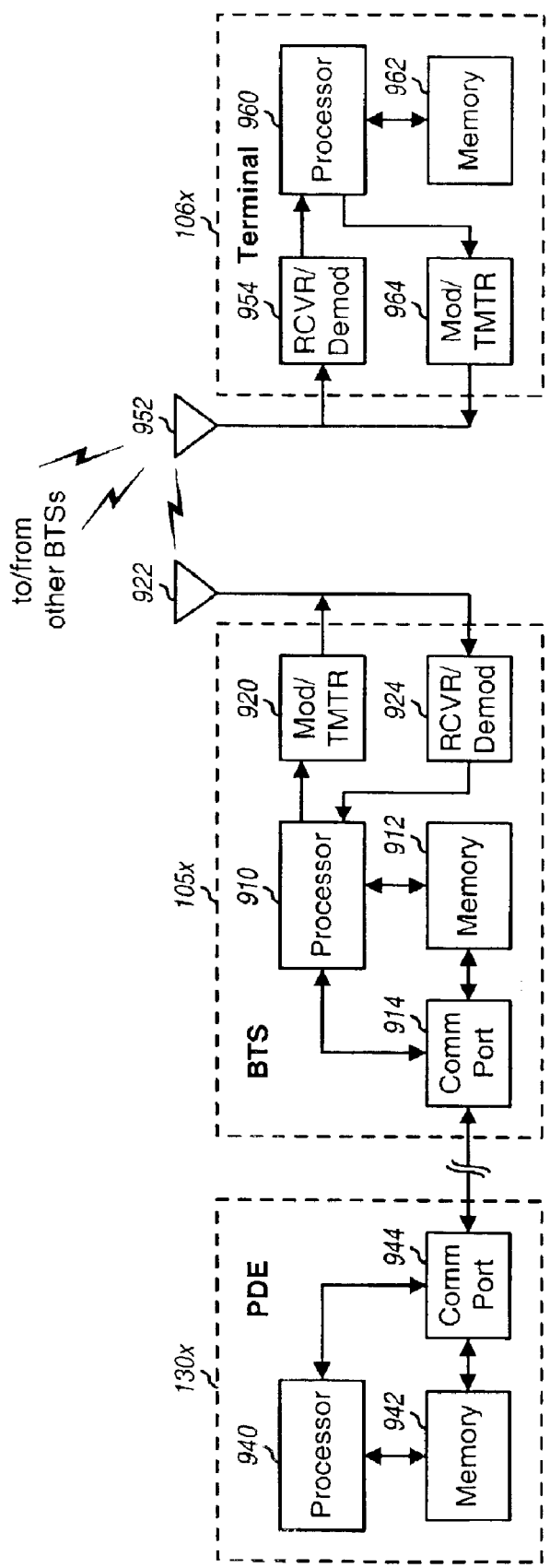
FIG. 9 is a simplified block diagram of various elements of the network shown in FIG. 1.

FIG. 9 is a simplified block diagram of various elements of network 100. Terminal 106x may be a cellular telephone, a computer with a wireless modem, a stand-alone position determining unit, or some other unit. BTS 105x is shown operatively coupled to a PDE 130x (e.g., via BSC 120, which is not shown in FIG. 9 for simplicity).

On the forward link, data, pilot, and signaling to be transmitted by BTS 105x is processed (e.g., coded, modulated, filtered, amplified, quadrature modulated, and upconverted) by a modulator/transmitter (Mod/TMTR) 920 to provide a forward link modulated signal, which is then transmitted via an antenna 922 to the terminals within the coverage area of the BTS. Terminal 106x receives the forward link modulated signals from a number of BTSs (including BTS 105x) at an antenna 952, and the received signal is routed to a receiver/demodulator (RCVR/Demod) 954. RCVR/Demod 954 then processes the received signal in a complementary manner to provide various types of information that may be used for position determination. In particular, RCVR/Demod 954 may provide the identity and the received signal strength (or received power) of each received BTS to a processor 960. RCVR/Demod 954 may implement a rake receiver that is capable of concurrently processing multiple signal instances (or multipath components) in the received signal for a number of received BTSs. The rake receiver includes a number of finger processors (or fingers), each of which may be assigned to process and track a particular multipath component.

On the reverse link, data, pilot, and/or signaling to be transmitted by terminal 106x are processed by a modulator/transmitter (Mod/TMTR) 964 to provide a reverse link modulated signal. The reverse link modulated signal is then transmitted via antenna 952 to the BTSs. BTS 105x receives the reverse link modulated signal from terminal 106x at antenna 922. The received signal is then routed to a receiver/demodulator (RCVR/Demod) 924. RCVR/Demod 924 processes the received signal in a complementary manner to provide various types of information, which may then be provided to a processor 910.

In the embodiment shown in FIG. 9, a communication (Comm) port 914 within BTS 105x operatively couples (e.g., via a base station controller) to a communication port 944 within PDE 130x. Communication ports 914 and 944 allow BTS 105x and PDE 130x to exchange pertinent information for position determination (which may have been received from terminal 106x).

The approximate position fix for the terminal using area based position determination may be computed at terminal 106x, BTS 105x, PDE 130x, or some other network entity. The entity performing the area based position determination is provided with the pertinent information needed to derive the approximate position fix. Such information may include, for example, the identities (e.g., Base ID) of the measured BTSs to be used to determine the combined expected area, the expected area (e.g., the center, size, and shape) for each measured BTS, the received signal strength or received power for each measured BTS, and so on. Some of this information may be obtained from a base station Almanac. The Almanac may include various types of information, such as: (1) the identity of each BTS, (2) the BTS sector center location, (3) the maximum antenna range, (4) the antenna orientation, and so on. The designated network entity then derives a combined expected area. The combined expected area may then be provided as the terminal's approximate position fix.

The processing to estimate a position fix for the terminal may be performed by a processor 960 within terminal 106x, processor 910 within BTS 105x, or a processor 940 within PDE 130x. Memory units 962, 912, and 942 may be used to store various types of information used for determining position, such as, for example, the base station Almanac, the received signal strengths or received powers, and so on. Memory units 962, 912, and 942 may also store program codes and data for processors 960, 910, and 940, respectively.

The method and apparatus described herein may be used to provide a more accurate approximate position fix for a terminal that is in communication with and/or can receive signals from multiple BTSs, without requiring a full time-of-arrival (TOA) or time-difference-of-arrival (TDOA) based solution. By combining the expected areas for multiple measured BTSs, the terminal's position may be estimated up to two to three times more accurate than an conventional position estimate based on the coverage area for a single (e.g., reference) BTS. In one specific test performed in an urban environment, the expected area solutions were found to have typical errors of 1 to 2 kilometers while the combined expected area solutions were found to have typical errors of 250 to 500 meters, which is a dramatic improvement in accuracy.

The approximate position fix derived using area based position determination may be used as an initial position estimate for a terminal. This initial position estimate may be needed, for example, to provide aiding information used to perform a range-domain position fix. The initial position estimate may also be used to shorten the amount of time needed to derive the range-domain position fix, which is desirable. The approximate position fix may also be used as a final position estimate for a terminal. This final position estimate may be provided, for example, if a range-domain position solution fails, or is less accurate than the position-domain solution. As a final position fix, it is highly desirable to provide as accurate a position-domain position fix as possible.

The method and apparatus described herein may be implemented by various means, for example, in hardware, software, or a combination thereof. For a hardware implementation, the method and apparatus described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or a combination thereof.

For a software implementation, the method described herein may be implemented with modules (e.g., procedures, functions, and so on) that perform the functions described herein. The software codes may be stored in a memory unit (e.g., memory 962, 912, or 942 in FIG. 9) and executed by a processor (e.g., processor 960, 910, or 940). The memory unit may be implemented within the processor or external to the processor, in which case it can be communicatively coupled to the processor via various means as is known in the art.

The previous description of the disclosed embodiments is provided to enable any person skilled in the art to make or use the present invention. Thus, the present invention is not intended to be limited to the embodiments shown herein. Rather, the invention should be limited only by those limitation expressed within the claims appended hereto.

What is claimed is:

1. A method of estimating the position of a wireless terminal, comprising:
   receiving identities of a plurality of transmitters to be used to estimate the position of the terminal;
   determining a plurality of expected areas for the plurality of transmitters;
   adjusting the expected area associated with each transmitter based on at least one assigned scale factor to determine an adjusted expected area associated with the transmitter; and
   combining the plurality of expected areas for the plurality of transmitters to estimate the position for the terminal.

2. The method of claim 1, wherein the approximate position estimate further comprises an uncertainty in the estimated position.

3. The method of claim 2, wherein the uncertainty is provided by an area within which the terminal is likely to be located.

4. The method of claim 1, further comprising:
   combining the approximate position estimate with a second position estimate to estimate a final position for the terminal.

5. The method of claim 1, wherein the expected area associated with each transmitter comprises an estimated position of the terminal and an area within which the terminal is likely to be located, given only that the signal from the transmitter is received by the terminal.

6. The method of claim 1, wherein the adjusting the expected area associated with each transmitter includes
   moving a center of the expected area based on a first assigned scale factor.

7. The method of claim 6, wherein the adjusting the expected area associated with each transmitter further includes
   scaling a size of the expected area based on the first assigned scale factor.

8. The method of claim 1, wherein adjusting the expected area associated with each transmitter further includes
   scaling a size of the expected area based on a first assigned scale factor, and
   moving a center of the expected area based on a second assigned scale factor.

9. The method of claim 1, wherein the adjusting the expected area associated with each transmitter includes
   moving a center of the expected area based on a predicted power and a received power for the transmitter.

10. The method of claim 9, wherein the predicted power is determined based on a path loss prediction model.

11. The method of claim 1, wherein at least one scale factor for each transmitter is determined based on received signal strength for the transmitter as measured at the terminal.

12. The method of claim 1, wherein at least one scale factor for each transmitter is determined based on received power for the transmitter as measured at the terminal.

13. The method of claim 1, wherein at least one scale factor for each transmitter is determined based on transmit power of the transmitter.

14. The method of claim 1, wherein at least one scale factor for each transmitter is determined based on a round trip delay (RTD) measurement made by the transmitter.

15. The method of claim 1, wherein the plurality of expected areas are combined to determine a combined expected area that is provided as the estimate of the position of the terminal.

16. The method of claim 15, wherein the combining the plurality of expected areas includes
   combining centers of the plurality of expected areas to determine a center for the combined expected area.

17. The method of claim 1, wherein the expected area associated with each transmitter is determined based on a maximum antenna range associated with the transmitter.

18. The method of claim 1, wherein the expected area associated with each transmitter is determined based on antenna location and orientation for the transmitter.

19. The method of claim 1, wherein the expected area associated with each transmitter comprises a location to be used as an estimated position of a terminal and an area within which the terminal is likely to be located.

20. A method of estimating the position of a wireless terminal, comprising:
   receiving identities of a plurality of transmitters to be used to estimate the position of the terminal;
   determining a plurality of expected areas for the plurality of transmitters; and combining the plurality of expected areas for the plurality of transmitters to estimate the position for the terminal;
   wherein the plurality of expected areas are combined to determine a combined expected area that is provided as the estimate of the position of the terminal;
   wherein the combining the plurality of expected areas includes combining centers of the plurality of expected areas, based on a predicted power and a received power for each transmitter, to determine a center for the combined expected area.

21. The method of claim 20, wherein the center for the combined expected area is determined such that a root mean square difference between predicted powers and received powers for the plurality of transmitters is minimized.

22. A method of estimating the position of a wireless terminal, comprising:
   receiving identities of a plurality of transmitters to be used to estimate the position of the terminal;
   determining a plurality of expected areas for the plurality of transmitters; and
   combining the plurality of expected areas for the plurality of transmitters to estimate the position for the terminal;

wherein the plurality of expected areas are combined to determine a combined expected area that is provided as the estimate of the position of the terminal;

wherein the combining the plurality of expected areas includes determining a unit fault for the combined expected area, and scaling the combined expected area based on the unit fault.

23. The method of claim 22, wherein the unit fault is determined based on a normalized average separation-sigma between the combined expected area and each of the plurality of expected areas.

24. A method of estimating the position of a wireless terminal, comprising:

receiving identities of a plurality of transmitters to be used to estimate the position of the terminal;

determining a plurality of expected areas for the plurality of transmitters; and combining the plurality of expected areas for the plurality of transmitters to estimate the position for the terminal;

wherein the combining the plurality of expected areas includes determining a plurality of weights for the plurality of expected areas, and wherein the plurality of expected areas are combined based on the plurality of weights.

25. The method of claim 24, wherein the weight for each expected area is determined based on an uncertainty associated with the expected area.

26. The method of claim 25, wherein the uncertainty associated with each expected area is expressed as a horizontal estimated position error (HEPE).

27. A method of estimating the position of a wireless terminal, comprising:

receiving identities of a plurality of transmitters to be used to estimate the position of the terminal;

determining a plurality of expected areas for the plurality of transmitters; and combining the plurality of expected areas for the plurality of transmitters to estimate the position for the terminal;

wherein the combining the plurality of expected areas includes determining a plurality of weights for the plurality of expected areas, scaling the plurality of expected areas based on the associated weights, combining the scaled expected areas to determine a combined expected area, scaling centers of the plurality of expected areas based on the associated weights, combining the scaled centers of the plurality of expected areas to determine a center for the combined expected area, and wherein the combined expected area and the combined expected area center are provided as the estimate of the position of the terminal.

28. A method of estimating the position for a terminal in a wireless communication network, comprising:

receiving identities of a plurality of transmitters to be used to estimate the position of the terminal;

determining an expected area and a scale factor for each of the plurality of transmitters;

adjusting each expected area based on the associated scale factor to provide an adjusted expected area;

determining a plurality of weights for the plurality of transmitters;

combining the plurality of adjusted expected areas based on the plurality of weights to determine a combined expected area to be provided as the estimated position of the terminal.

29. The method of claim 28, wherein the scale factor for each transmitter is determined based on received signal strength or received power for the transmitter as measured at the terminal.

30. The method of claim 28, wherein the weight for each expected area is determined based on an uncertainty associated with the expected area.

31. The method of claim 28, wherein the combining the plurality of expected areas includes weighting centers of the plurality of expected areas based on the associated weights, combining the weighted centers of the expected areas to determine the center of the combined expected area, scaling the plurality of expected areas based on the associated weights, and combining the scaled expected areas to determine the combined expected area.

32. The method of claim 28, wherein the wireless communication network is a CDMA network.

33. An apparatus in a wireless communication network, comprising:

means for receiving identities of a plurality of transmitters to be used to estimate the position of the terminal;

means for determining a plurality of expected areas for the plurality of transmitters; and means for combining the plurality of expected areas for the plurality of transmitters to estimate the position of the terminal;

means for weighting centers of the plurality of expected areas based on the associated weights, means for combining the weighted centers of the expected areas to determine the center of the combined expected area, means for scaling the plurality of expected areas based on the associated weights, and means for combining the scaled expected areas to determine the combined expected area.

34. An apparatus for estimating the position of a wireless terminal, comprising:

means for receiving identities of a plurality of transmitters to be used to estimate the position of the terminal;

means for determining a plurality of expected areas for the plurality of transmitters;

means for adjusting the expected area associated with each transmitter based on at least one assigned scale factor to determine an adjusted expected area associated with the transmitter; and means for combining the plurality of expected areas for the plurality of transmitters to estimate the position for the terminal.

35. An apparatus for estimating the position of a wireless terminal, comprising:

means for receiving identities of a plurality of transmitters to be used to estimate the position of the terminal;

means for determining a plurality of expected areas for the plurality of transmitters; and means for combining the plurality of expected areas for the plurality of transmitters to estimate the position for the terminal;

wherein the plurality of expected areas are combined to determine a combined expected area that is provided as the estimate of the position of the terminal;

wherein the combining the plurality of expected areas includes combining centers of the plurality of expected areas, based on a predicted power and a received power for each transmitter, to determine a center for the combined expected area.

36. A method of estimating the position of a wireless terminal, comprising:
   means for receiving identities of a plurality of transmitters to be used to estimate the position of the terminal;
   means for determining a plurality of expected areas for the plurality of transmitters; and
   means for combining the plurality of expected areas for the plurality of transmitters to estimate the position for the terminal;
   wherein the plurality of expected areas are combined to determine a combined expected area that is provided as the estimate of the position of the terminal; wherein the combining the plurality of expected areas includes determining a unit fault for the combined expected area, and scaling the combined expected area based on the unit fault.

37. An apparatus for estimating the position of a wireless terminal, comprising:
   means for receiving identities of a plurality of transmitters to be used to estimate the position of the terminal;
   means for determining a plurality of expected areas for the plurality of transmitters; and
   means for combining the plurality of expected areas for the plurality of transmitters to estimate the position for the terminal;
   wherein the means for combining the plurality of expected areas comprises,
      means for determining a plurality of weights for the plurality of expected areas,
      means for scaling the plurality of expected areas based on the associated weights,
      means for combining the scaled expected areas to determine a combined expected area,
      means for scaling centers of the plurality of expected areas based on the associated weights,
      means for combining the scaled centers of the plurality of expected areas to determine a center for the combined expected area, and wherein the combined expected area and the combined expected area center are provided as the estimate of the position of the terminal.

* * * * *